Patented Feb. 14, 1933

1,897,469

UNITED STATES PATENT OFFICE

WILLIAM DAWES FAWTHROP, OF SEATTLE, WASHINGTON

ADHESIVE AND METHOD OF MAKING THE SAME

No Drawing.  Application filed February 5, 1930. Serial No. 425,989.

This invention relates to adhesives and highly adhesive compounds as well as a method of making said adhesives or adhesive compounds. The invention is based on the discovery that treating vegetable protein matter with acids or acid reacting chemicals in small quantities will break down the protein meal, separate out the carbohydrates from the protein, that is, in an aqueous solution the carbohydrates dissolve and leave the protein free to be acted upon by a strongly alkaline solution which is added subsequently, in excess so as to produce a colloidal or glue-like mass as and when desired.

I have discovered by using acids, organic or inorganic, or a mixture of an acid or acids, as well as acid reacting chemicals, and vegetable protein matter such as soya bean meal or flour, peanut meal, cotton seed meal, linseed meal, and the like, mixed together in a dry state with the acid or acid reacting agent in small proportion, and then adding thereto a proper amount of water under suitable conditions to obtain a reaction, that the protein matter will be in a condition to be acted upon by a subsequently added strongly alkaline solution in excess, as will be more fully outlined below to yield ultimately the desirable adhesive aforementioned.

It is important to observe that the amount of acid must be relatively small, otherwise the desired results will not be obtained. By a small amount of acid or acid reacting agent there is meant approximately from one to two or three per cent of said reacting reagent which may be mixed with the vegetable protein meal or flour which is in preferably the dry state.

In some instances as much as four per cent of the acid or acid reacting chemical may be desirable. On the other hand, as little as one-half of one per cent may be used with success. If a large amount of acid be used, the protein as well as the carbohydrates will dissolve. It is preferable to use a cheap acid, such as dry tannic acid, powdered boric acid, oxalic acid and the like. On the other hand such acids as tartaric acid, citric acid, salicylic acid, benzoic acid and the like may be used with equal success but these are more expensive.

The carbohydrates in acid solution are also acted upon by the added alkaline solution in excess, producing a colloidal mass having also considerable adhesive value.

Examples of suitable proportions of the meal or flour and the acid reacting reagents are given below.

Example 1

| | Parts |
|---|---|
| Soya bean flour or meal | 98 |
| Powdered boric acid | 2 |

The example above named is in a dry powdered state and the acid and meal or flour are thoroughly mixed and may be used at any time thereafter by simply adding the proper amounts of water under suitable conditions to produce a smooth creamy mixture which is non-adhesive at this stage. Thereafter a strongly alkaline solution in excess is added and the mixture agitated for a short period of time until a colloidal conditions is obtained. As a specific example, for the above powdered mixture, I find approximately 340 parts of water at from 80 to 100° F. suitable. This mixture is agitated in a suitable mixer for about six or seven minutes. Thereafter a strongly alkaline solution such as 7 to 8 parts of caustic soda dissolved in approximately 25 parts of water is then added and agitated for 7 or 8 minutes when the glue is ready for use.

Example 2

| | Parts |
|---|---|
| Soya bean flour or meal | 99 |
| Tannic acid | 1 |

The above dry powdered mixture is activated by adding water and the alkaline solution in the manner set out under Example 1.

Example 3

| | Parts |
|---|---|
| Soya bean flour or meal | 98½ |
| Zinc sulphate | 1½ |

The glue mixture is further completed as described in connection with Example 1.

Example 4

| | Parts |
|---|---|
| Soya bean flour or meal | 97 |
| Potassium dichromate | 2 |
| Zinc sulphate | 1 |

The powdered mixture of Example 4 is likewise completed, following the instructions in connection with Example 1.

Examples of acid reacting chemicals are—zinc sulphate, potassium dichromate, potassium sulphate, aluminum sulphate, sodium bisulphide, magnesium sulphate, sodium acid fluoride, barium chloride, etc.

The above specific instances are given to illustrate the invention as applied to the use of small amounts of acid in connection with the vegetable protein matter. The point it emphasizes is that under the conditions and by the process steps outlined I have placed the protein in a condition where it can be acted on freely by alkali when the alkaline solution is added to the mixture in accordance with the steps outlined above. As long as the powder material is kept in a dry state no reaction of course will take place. The small amount of acid will react when water is added under suitable conditions, and the protein containing material is now in a condition to be treated with the excess of alkaline solution and agitated as stated above, thereby producing the desired colloidal condition, in other words, to the vegetable matter, such as soy bean meal or flour, peanut meal or flour, cotton seed meal or flour, linseed meal or flour, is mixed (preferably in the dry state) the acid or acid reacting agent in small proportions, that is from ½ of 1% to 4% has been used most effectively. This dry glue base or adhesive base is thus sold or stored. It can be activated quickly at any time thereafter by the mere addition of water in the manner stated in Example 1. The relatively small percentage of added acid or acid reacting chemical when dissolved in water acts to produce loosening up of the constituents of the meal or flour. The soluble portions of the carbohydrates go into solution, leaving the protein cellulosic substance in a condition to be effectively acted upon by the addition of an excess of strongly alkaline solution under the conditions stated above.

To one versed in the art it is evident that a great variety of combinations may be produced which embrace the principles of my invention. By my acid treatment I claim to have discovered a simpler and more economical method for the producing of concentrated and stronger adhesives wherein the amounts of chemicals used are correspondingly small and the percentages of protein proportionately higher.

It should be noted that the protein meal or flour combined with water does not produce a valuable adhesive product. The valuable adhesive product is produced when the alkali reacts with the acid and protein.

The acid or acid reacting chemicals, water and alkali produce a chemical action resulting in a colloidal substance or adhesive, which is more or less irreversible, according to the acid or acid reacting chemicals used; producing for instance, when tannin is used, sodium tannate. After sodium tannate is formed then the protein acts to form protein tannate, which is insoluble.

What I claim therefore as new and useful and desire to secure by Letters Patent is:

1. That process of making a vegetable protein glue which comprises mixing deoiled vegetable protein flour with approximately one to two per cent of an acid reacting chemical, then dissolving said chemical in an excess of water and adding to said solution a strongly alkaline solution in excess at a temperature of approximately 80° to 100° F. and agitating.

2. That process of making a vegetable protein glue which comprises mixing deoiled vegetable protein flours with less than 3% of an acid reacting mixture, then liquefying said mixture and adding an excess of alkaline solution at approximately 100° F. and agitating the mass.

3. That process of making a vegetable protein glue which comprises mixing soya bean flour and a powdered acid reacting agent up to 2%, then adding water in excess to dissolve said powdered acid, and then adding an alkaline solution in excess and agitating to produce a glue mass.

4. That process of making a vegetable protein glue which comprises mixing soya bean flour and a tannic acid agent up to 2%, then adding water in excess to dissolve said tannic acid, and then adding an alkaline solution in excess and agitating to produce a glue mass.

5. A vegetable protein blue base comprising vegetable protein flour mixed with less than 3% of an acid reacting agent in a dry state in condition to be activated by an alkali in a watery solution and having the protein agglutinized.

6. An adhesive base composition comprising a vegetable protein deoiled meal mixed with 2% of tannic acid in a dry state and capable of being converted into an adhesive by the addition of an alkaline solution.

7. The process of making a vegetable protein glue which comprises dry mixing a relatively small percentage of an acid reacting chemical with a vegetable protein meal, then adding water to produce a reaction, then adding an excess of a strongly alkaline solution, and agitating the mass to form a colloidal glue composition.

8. As an article of manufacture, an adhesive base composition comprising vegetable protein meal mixed with an acid agent in the dry state, said composition being soluble in water to render the acid agent active without glutenizing said vegetable protein meal but readily glutenized upon the addition of a strongly alkaline solution in excess.

9. The process of making vegetable protein glue which comprises mixing vegetable protein flours with a relatively small percentage of an acid reacting chemical, then adding water to form a solution, thereafter adding a strongly alkaline solution in excess and agitating to produce a colloidal mass.

In testimony whereof I have hereunto set my hand on this 23rd day of January A. D., 1930.

WILLIAM DAWES FAWTHROP.